US012625764B2

(12) United States Patent
Wan et al.

(10) Patent No.: US 12,625,764 B2
(45) Date of Patent: May 12, 2026

(54) MEMORY DEVICE BAD COLUMN IDENTIFICATION AND COMPENSATION

(71) Applicant: MICRON TECHNOLOGY, INC., Boise, ID (US)

(72) Inventors: Jun Wan, San Jose, CA (US); Ying Tai, Mountain View, CA (US); Wei Wang, Dublin, CA (US); Zhenming Zhou, San Jose, CA (US)

(73) Assignee: MICRON TECHNOLOGY, INC., Boise, ID (US)

( * ) Notice: Subject to any disclaimer, the term of this patent is extended or adjusted under 35 U.S.C. 154(b) by 10 days.

(21) Appl. No.: 18/817,007

(22) Filed: Aug. 27, 2024

(65) Prior Publication Data

US 2026/0064526 A1      Mar. 5, 2026

(51) Int. Cl.
*G06F 11/10*          (2006.01)

(52) U.S. Cl.
CPC ................................. G06F 11/1044 (2013.01)

(58) Field of Classification Search
CPC ... G06F 11/48; G06F 11/1044; G06F 11/1096
See application file for complete search history.

(56) References Cited

U.S. PATENT DOCUMENTS

| | | | | |
|---|---|---|---|---|
| 7,174,477 B2 * | 2/2007 | Derner | ................. | G11C 29/822 714/710 |
| 8,179,717 B2 | 5/2012 | Shepard et al. | | |

| | | | | |
|---|---|---|---|---|
| 9,268,632 B2 * | 2/2016 | Linstadt | ................. | G11C 16/26 |
| 9,348,694 B1 | 5/2016 | Nassie | | |
| 9,490,849 B1 * | 11/2016 | Varnica | ............... | G06F 11/1076 |
| 11,106,531 B2 * | 8/2021 | Kuo | .................... | G06F 11/1068 |
| 11,159,175 B2 * | 10/2021 | Vanaparthy | ....... | H03M 13/6502 |
| 11,444,638 B2 | 9/2022 | Asadi et al. | | |
| 12,198,779 B2 * | 1/2025 | Honma | ............... | G06F 11/1072 |
| 2011/0228620 A1 | 9/2011 | Chou | | |
| 2016/0179620 A1 | 6/2016 | Bazarsky et al. | | |
| 2017/0229192 A1 | 8/2017 | Sohn et al. | | |
| 2020/0219580 A1 | 7/2020 | Khan et al. | | |
| 2022/0139482 A1 | 5/2022 | Kim et al. | | |
| 2024/0168845 A1 | 5/2024 | Jeong et al. | | |

OTHER PUBLICATIONS

WOISR: Notification of Transmittal of the International Search Report and the Written Opinion of the International Searching Authority, or the Declaration mailed Nov. 26, 2025 for corresponding PCT/US2025/039461.

* cited by examiner

*Primary Examiner* — Esaw T Abraham
(74) *Attorney, Agent, or Firm* — Tarolli, Sundheim, Covell & Tummino LLP

(57)          ABSTRACT

A method for managing error correction in a memory device includes identifying, by a memory controller, codewords in a memory array of the memory device that have bad columns. The method includes calculating, by the memory controller, an increased Error Correction Code (ECC) layer for each identified codeword based on a number of errors introduced by the bad columns. The method also includes redistributing, by the memory controller, ECC layers from one or more other codewords that have extra ECC layers to increase the ECC layers for the identified codewords with bad columns to enable implementation of the redistributed ECC layers on each codeword in the memory array.

20 Claims, 7 Drawing Sheets

300

| Memory Page | | | | | Plane |
|---|---|---|---|---|---|
| 0 | 4kB+30L | 4kB+30L | 4kB+30L | 4kB+30L | 0 |
| 1 | 4kB+30L | 4kB+30L | 4kB+30L | 4kB+30L | 1 |
| 2 | 4kB+30L | 4kB+30L | 4kB+30L | 4kB+30L | 2 |
| 3 | 4kB+30L | 4kB+30L | 4kB+30L | 4kB+30L | 3 |
| 4 | 4kB+30L | 4kB+30L | 4kB+30L | 4kB+30L | 4 |
| ... | | | | | ... |

320

| Memory Page | | | | | Plane |
|---|---|---|---|---|---|
| 0 | 4kB+30L | 4kB+30L | 4kB+30L | 4kB+30L | 0 |
| 1 | 4kB+30L | 4kB+30L | 4kB+30L | 4kB+30L | 1 |
| 2 | 4kB+30L | 4kB+30L | 4kB+29L | 4kB+31L | 2 |
| 3 | 4kB+30L | 4kB+30L | 4kB+30L | 4kB+30L | 3 |
| 4 | 4kB+30L | 4kB+30L | 4kB+30L | 4kB+30L | 4 |
| ... | | | | | ... |

| Case No. | No. Bad Column in Each Codword | ECC Parity Levels Per Codword | Equivalent RWB Loss for ECC |
|---|---|---|---|
| 1-Original | 0/0/0/32 | 30L/30L/30L/30L | 100 mV |
| 1-Modified | 0/0/0/32 | 29L/29L/29L/33L | 30 mV |
| 2-Original | 0/0/0/100 | 30L/30L/30L/30L | 300 mV |
| 2-Modified | 0/0/0/100 | 27L/27L/27L/39L | 90 mV |

500

MEMORY DEVICE BAD COLUMN IDENTIFICATION AND COMPENSATION

TECHNICAL FIELD

This disclosure relates to identifying bad columns on a memory device and compensating for the bad columns by redistributing error correction codes (ECCs).

BACKGROUND

A memory sub-system includes a memory device designed for data storage. These memory devices are implemented as non-volatile and volatile memory devices in various examples. In some such examples, a host system employs a memory sub-system for the purposes of storing data on the memory devices and for retrieving data from the memory devices.

Bad columns in a non-volatile memory device, such as Not-AND (NAND) memory are defects that occur during the manufacturing process and can negatively impact the functionality and reliability of the memory device. These defects can arise from physical imperfections in the semiconductor material, errors in the photolithography process, or electrical failures such as faulty gate oxides and charge leakage. Bad columns compromise data integrity, reduce the overall yield of production batches and can degrade the performance of the memory device.

BRIEF DESCRIPTION OF THE DRAWINGS

FIG. 3 illustrates spreadsheets that represent portions of a memory array.

DETAILED DESCRIPTION

Figure 1A:
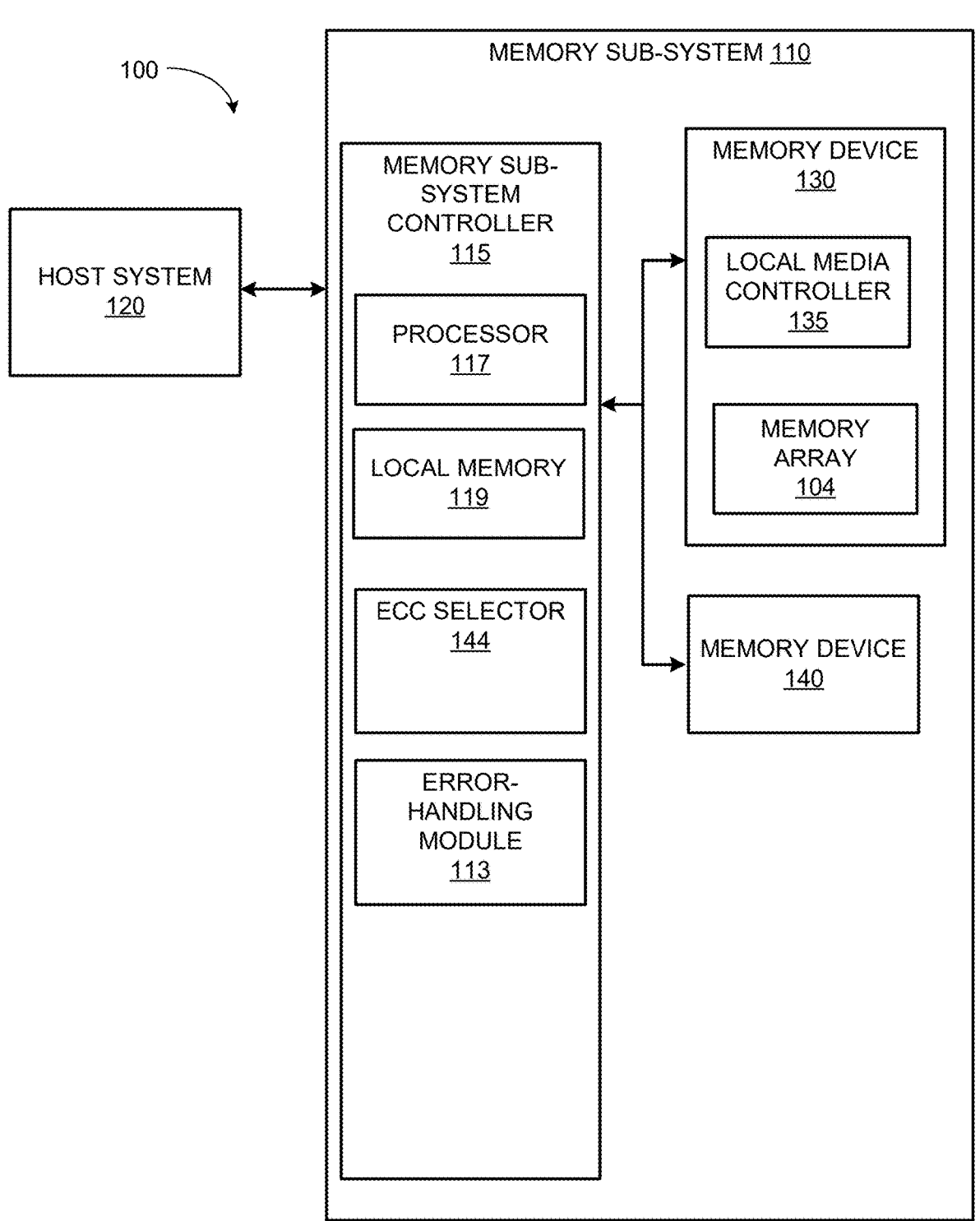
FIG. 1A illustrates a system for redistributing error correction codes (ECCs) on a memory sub-system.

This description relates to an innovative approach to enhancing a yield and reliability of a non-volatile memory device (e.g., a memory integrated circuit (IC) chip), such as Not-AND (NAND) memory by dynamically redistributing Error Correction Code (ECC) capabilities across a die of the memory device. This dynamic redistribution includes adjusting a number of ECC layers allocated to different sectors or codewords based on defect densities, thereby increasing ECC protection in areas with higher concentrations of defects while reducing ECC in less affected areas. This redistribution can be managed logically by a memory controller, such that the redistribution does not require physical relocation of ECC data but rather tunes ECC application to improve error correction efficiency where most needed. This strategy not only helps in recovering more usable memory from each production batch but also enhances an overall performance and reliability of the memory device.

More generally, some examples of a memory sub-system include high density non-volatile memory devices where retention of data is desired during intervals of time where no power is supplied to the memory device. One example of non-volatile memory devices is a NAND memory device. A non-volatile memory device is a package that includes a die(s). Each such die can include a plane(s). For some types of non-volatile memory devices (e.g., NAND memory devices), each plane includes a set of physical blocks, and each physical block includes a set of pages that are organized in wordlines. Each page includes a set of memory cells, which are commonly referred to as cells. A cell is an electronic circuit that stores information. A cell stores at least one bit of binary information and has various logic states that correlate to the number of bits being stored. The logic states can be represented by binary values, such as '0' and '1', or as combinations of such values, such as '00', '01', '10' and '11'.

The memory sub-system controller is configured/programmed to encode the host and other data, as part of a write operation, into a format for storage at the memory device(s). Encoding refers to a process of generating parity bits from embedded data (e.g., a sequence of binary bits) using an error correction code (ECC) and combining the parity bits to the embedded data to generate a codeword. Low-density parity check (LDPC) encoding refers to an encoding method that utilizes an LDPC code to generate the parity bits.

Additionally, the memory sub-system controller can decode codewords, as part of a read operation, stored at the memory device(s) of the memory sub-system. Decoding refers to a process of reconstructing the original embedded data (e.g., sequence of binary bits) from the codeword (e.g., the encoded original embedded data) received from storage at the memory device(s). LDPC decoding refers to a decoding method that utilizes the LDPC code to reconstruct the original embedded data.

An ECC layer refers to a specific implementation level of error correction coding that includes additional parity bits that are calculated from the original data bits and stored alongside the original bits. These parity bits are used by ECC algorithms (such as an LDPC algorithm) to check for inconsistencies in the data when the data is read back from the memory. If errors are detected, the ECC algorithm uses the information from these parity bits to attempt to locate and correct the errors.

Each ECC layer enhances the ability of the system to correct more errors, providing a more robust defense against data corruption. The term "layer" in this context refers to a level of complexity and protection in the ECC scheme, where adding more layers increases the number of parity bits and, consequently, the capability to correct more errors or larger errors. The implementation of ECC layers involves sophisticated coding algorithms, with common types including Hamming codes, Reed-Solomon codes, and LDPC codes. Each type of ECC algorithm offers different strengths in terms of error correction capabilities and computational requirements, and the choice of ECC type and the number of layers used will depend on the specific needs of the storage system, including the acceptable balance between data protection strength and performance overhead.

A block refers to a unit of a memory device used to store data. In various examples, the unit could be implemented as a group of memory cells, a wordline group, a wordline or as individual memory cells. Multiple blocks are grouped together to form separate partitions (e.g., planes) of the memory device to enable concurrent operations to take place on each plane. A solid-state drive (SSD) is an example of a memory sub-system that includes a non-volatile memory device(s) and a memory sub-system controller to manage the non-volatile memory device(s).

A memory page in the context of non-volatile memory devices, such as NAND memory, refers to a smallest writable and readable unit within the memory structure. Each memory page is formed with numerous memory cells where data is stored. In NAND memory, for example, a memory page is where actual user data gets written along with additional metadata used for managing the memory and ensuring data integrity. This metadata might include ECC parity that helps to detect and correct errors that might occur during data read/write cycles. The size of a memory page can vary depending on the specific type of memory technology and the manufacturer's design. Common page sizes in NAND memory range from 4 KB to 16 KB or more. Memory pages are organized into wordlines, which are in turn organized into blocks. More specifically, in NAND memory, the relationship between blocks, wordlines and pages is structured hierarchically for operation of the memory.

In the physical domain, a memory device includes multiple cells arranged in a two-dimensional or a three-dimensional grid. In some examples, memory cells are formed on a silicon wafer in an array of columns connected by conductive lines (also referred to as bitlines, or BLs) and rows connected by conductive lines (also referred to as wordlines or WLs). More specifically, each bitline is a conductive path that runs vertically through the array of memory cells, directly connecting the cells in a specific column. Bitlines are responsible for applying the necessary voltages to the memory cells during read, write and erase operations. Each bitline is connected to the cells in a particular column of the array. A wordline has a row of associated memory cells in a memory device that are used with a bitline or multiple bitlines to generate the address of each of the memory cells. The intersection of a bitline and a wordline defines an address of a given memory cell.

Faults or defects in a bitline can impact an entire column of cells served by that bitline. To ensure data integrity, especially in the event of bitline defects or errors, the memory device employs ECC and other memory management strategies, including mapping out defective bitlines and using redundant bitlines when necessary. Thus, bitlines are integral to both the structure and the function of the memory device, influencing the performance and reliability of the memory columns connected by these bitlines.

When a bad column is present in a memory device, the impact directly affects the bitlines associated with that particular bad column, leading to potential data integrity issues and operational challenges. A bad column typically results from defects in the bitlines themselves or in the memory cells connected by these bitlines. A bad column poses a risk to data integrity, as memory cells in a bad column may not reliably hold charge, leading to incorrect data being read from or written to these cells. During read operations, if a bitline is defective, the bitline may not accurately sense the charge levels of the cells, resulting in read errors. Similarly, during write operations, a faulty bitline may not correctly apply the necessary voltages to change the state of the cells, causing write failures or further degradation of the cell's reliability.

Moreover, bad columns in a memory device impact die yield, a factor in the manufacturing process of these devices.

Die yield refers to the percentage of functional memory chips produced from a single silicon wafer. Bad columns, often resulting from defects in the manufacturing process such as imperfections in photolithography, material impurities or errors during etching, can render portions of a die unusable, thereby increasing the overall defect rate of the produced wafers. This leads to a reduction in the number of usable chips that can be harvested from each wafer, directly lowering the effective yield. The presence of bad columns necessitates additional resources for error correction, including extra silicon area for redundant columns and more sophisticated ECCs, which complicates the manufacturing process and increases production costs. Consequently, bad columns not only reduce the die yield by increasing the defect rate and decreasing the number of usable dies per wafer but also escalate manufacturing costs and pose challenges in maintaining product quality and reliability.

To address the problems raised by bad columns, the present description is related to systems and methods for managing error correction in non-volatile memory systems, particularly addressing the challenges posed by bad columns. In particular, to compensate for bad columns, the memory controller redistributes ECC capabilities across codewords of the memory die, tuning the allocation of ECC resources based on the defect density of individual columns of the memory device. This strategy enhances both the efficiency and reliability of the memory device.

In a previous approach, ECCs are uniformly applied across all memory cells to safeguard against data corruption caused by physical defects and electronic interference. However, this previous approach does not consider the uneven distribution of defects within the memory array that cause the bad columns, often resulting in inefficiencies. Some areas may exhibit a higher concentration of defects, necessitating more robust error correction, while others might be relatively defect-free and require less intensive ECC protection.

To redistribute the ECCs, the memory controller identifies codewords associated with the bad columns of the array in the memory device. The process begins with the identification of bad columns through testing and monitoring, pinpointing codewords that consistently exhibit errors due (e.g., due to the bad columns). Additionally, the memory controller determines how many bits within each such codeword are impacted by the bad columns by identifying bits in these codewords that have a low reliability.

In response to identifying the codewords with the bad columns, the memory controller calculates an ECC level needed to correct the errors introduced by these bad columns. The ECC layers are redistributed and implemented such that columns with a higher density of defects (e.g., corresponding to the codewords with bad columns) are allocated additional ECC layers, thereby enhancing their error correction capabilities. Conversely, columns that exhibit fewer defects receive a reduced number of ECC layers, which conserves ECC resources and reduces overhead without compromising the integrity of the stored data. In some examples, the redistribution of the ECC layers is determined prior to deployment of the memory device in a production environment (e.g., preprogrammed). In other examples, the redistribution of the ECC layers is a continuous process, adapting to changes in condition of the array of the memory device over time. For instance, in situations where the memory device is a NAND memory device, certain areas may degrade or develop new defects due to wear and environmental factors. The algorithms of the memory controller are configured to respond to these changes by adjusting the ECC layer distribution (e.g., in real-time), ensuring that the memory device maintains high performance and reliability throughout an operational lifespan of the memory device.

The operational benefits of this redistribution extend beyond enhanced error correction. By tuning the use of ECC resources, the memory sub-system can increase a yield of functional dies from each wafer during the manufacturing process. This improvement in yield reduces waste and lowers production costs, contributing to more economically efficient manufacturing of memory devices. Furthermore, the increased reliability and data integrity brought the redistribution of the ECCs layers enhances product quality. Additionally, the redistribution of ECC layers can be implemented without negatively impacting a read window budget (RWB) of the window device, such that the memory device can meet performance requirements.

FIG. 1A illustrates a system 100 that includes a memory sub-system 110 that can be a storage device, a memory module or a hybrid of a storage device and a memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card and a hard disk drive (HDD). Examples of memory modules include a dual in-line memory module (DIMM), a small outline DIMM (SO-DIMM) and various types of non-volatile dual in-line memory modules (NVDIMMs).

The system 100 can be a computing device such as a desktop computer, laptop computer, network server, mobile device, a vehicle (e.g., airplane, drone, train, automobile or other conveyance), Internet of Things (IoT) enabled device, embedded computer (e.g., one included in a vehicle, industrial equipment or a networked commercial device) or such computing device that includes memory and a processing device. The system 100 can include a host system 120 that is coupled to one or more memory sub-systems 110. In some examples, the host system 120 is coupled to different types of the memory sub-system 110. FIG. 1A illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller) and a storage protocol controller (e.g., PCIe controller, SATA controller, CXL controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a compute express link (CXL) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access the memory components (e.g., memory device(s) 130) when the memory sub-system 110 is coupled with the host system 120 by the physical host interface (e.g., PCIe or CXL bus). The physical host interface can provide an interface for passing control, address, data and other signals between the memory sub-system 110 and the host system 120. FIG. 1A illustrates a memory sub-system 110 as an example. In general, the host system 120 can access multiple memory sub-systems via a same communication connection, multiple separate communication connections and/or a combination of communication connections.

The memory device 130 and the memory device 140 are implemented as non-transitory computer readable media. The memory device 130 and the memory device 140 can include any combination of the different types of non-volatile memory devices and/or volatile memory devices. The volatile memory devices (e.g., the memory device 140) can be, but are not limited to, random access memory (RAM), such as dynamic random access memory (DRAM) and synchronous dynamic random access memory (SDRAM).

Some examples of non-volatile memory devices (e.g., memory device(s) 130) include Not-AND (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory device(s) 130 include one or more arrays of memory cells. One type of memory cell, for example, single level cells (SLC) can store one bit per cell. Other types of memory cells, such as multi-level cells (MLCs), triple level cells (TLCs), quad-level cells (QLCs) and penta-level cells (PLC's) or higher, can store multiple bits per cell. In some examples, each of the memory cells 130 can include one or more arrays of memory cells such as SLCs, MLCs, TLCs, QLCs or some combination thereof. In some examples, a particular memory device can include an SLC portion, an MLC portion, a TLC portion and/or a QLC portion of memory cells. The memory cells of the memory devices 130 can be grouped as pages that can refer to a logical unit of the memory device used to store data. In some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), not-OR (NOR) flash memory, electrically erasable programmable read-only memory (EEPROM), etc.

A memory sub-system controller 115 (or controller 115 for simplicity) communicates with the memory device(s) 130 to perform operations such as reading data, writing data or erasing data at the memory device(s) 130 and other such operations. The memory sub-system controller 115 can include hardware such as one or more integrated circuits and/or discrete components, a buffer memory or some combination thereof. The hardware can include a digital circuitry with dedicated (e.g., hard-coded) logic to perform the operations described herein. The memory sub-system controller 115 can be a microcontroller, special purpose logic circuitry (e.g., a field programmable gate array (FPGA), an application specific integrated circuit (ASIC), etc.) or other suitable processor.

The memory sub-system controller 115 can include a processing device, which includes one or more processors (e.g., the processor 117), configured to execute instructions stored in a local memory 119. In the illustrated example, the local memory 119 of the memory sub-system controller 115 includes an embedded memory configured to store instructions for performing various processes, operations, logic flows and routines that control operation of the memory sub-system 110, including handling communications between the memory sub-system 110 and the host system 120. The local memory 119 is a non-transitory computer-readable medium.

In some examples, the local memory 119 can include memory registers storing memory pointers, fetched data, etc. The local memory 119 can also include read-only memory (ROM) for storing micro-code. While the example memory sub-system 110 in FIG. 1A has been illustrated as including the memory sub-system controller 115, in another example, a memory sub-system 110 does not include a memory sub-system controller 115 and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device(s) 130. The memory sub-system controller 115 can be responsible for other operations such as wear leveling operations, garbage collection operations, error detection and error-correcting code (ECC) operations, encryption operations, caching operations and address translations between a logical address (e.g., a logical block address (LBA), namespace) and a physical address (e.g., physical block address) that are associated with the memory devices 130. The memory sub-system controller 115, for example, may employ a Flash Translation Layer (FTL) to translate logical addresses to corresponding physical memory addresses, which can be stored in one or more FTL mapping tables. In some instances, the FTL mapping table can be referred to as a logical-to-physical (L2P) mapping table storing L2P mapping information. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. For example, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some examples, the memory devices 130 include local media controllers 135 that operate in concert with the memory sub-system controller 115 to execute operations on one or more memory cells of the memory devices 130. An external controller (e.g., the memory sub-system controller 115) can externally manage the memory device 130 (e.g., perform media management operations on the memory device 130). In some examples, the memory sub-system 110 is a managed memory device, which is a raw memory device 130 having control logic (e.g., local media controller 135) on the die and a controller (e.g., the memory sub-system controller 115) for media management within the same memory device package. An example of a managed memory device is a managed NAND (MNAND) device.

The memory device 130 and the memory device 140 are organized into planes. The planes of the memory device 130 and the memory device 140 refer to subdivisions within a die of the memory device 130 and the memory device 140 for organizing and managing data storage and access efficiently. Each plane forms an independent section of the memory array 104, containing a set of blocks, pages and cells. This structural organization the planes enhances the performance and reliability of the memory device 130 and the memory device 140. In particular, planes enable parallel processing of data, where each plane can perform read, write or erase operations independently of other planes. This parallelism increases the overall throughput and speed of the memory device 130 and the memory device 140.

The memory device 130 and the memory device 140 include a memory array 104 that is structured to include wordlines. Wordlines are addressable wiring lines that connect and control a row of memory cells in the memory array 104 of the memory device 130 and the memory device 140. Each wordline addresses the cells in a corresponding row contemporaneously, enabling operations such as reading, writing and erasing data. The memory device 130 and the memory device 140 can be organized in blocks, with each block containing multiple pages. The cells in a page are connected by these wordlines horizontally and bitlines vertically, forming a grid-like structure that allows for efficient data access and management. A page contains several codewords and a page is the smallest unit of data that can be written to or read from the memory device 130 and the memory device 140. Each bitline is a conductive path that runs vertically through the memory array 104, directly connecting the cells in a specific column. The intersection of a bitline and a wordline defines an address of a given memory cell of the memory array 104.

The planes of the memory device 130 and the memory device 140 are organized such that each plane contains a number of memory blocks and each block has multiple pages of the memory array 104. The organization of blocks and pages within a plane follows a hierarchical structure, where blocks are the primary units for erase operations, and pages are the primary units for read and write operations.

In various examples, the memory sub-system 110 includes an error-handling module 113 that executes an error-handling of data read from the memory device 130 and/or the memory device 140. In operation, the host system 120 manages and controls the flow of data between itself and the memory sub-system 110, ensuring efficient data storage and retrieval operations. More generally, the host system 120 employs the memory sub-system 110 to write data to and read data from the memory sub-system 110. For instance, the host system 120 processes these request for reading and/or writing data by interacting with the memory sub-system 110, managing the flow of data to and from the memory device 130 and/or the memory device 140 within the memory sub-system 110. This reading and writing of data enables operation of computing systems where data access and management is needed. In various examples, the memory sub-system 110 also includes an ECC selector 144 that assigns ECC layers to pages of the memory array 104 to facilitate writing data to and reading data from the memory device 130 and the memory device 140.

In particular, the error-handling module 113 can decode codewords, as part of a read operation, stored at pages of the memory device 130 and the memory device 140. Decoding refers to a process of reconstructing the original embedded data (e.g., sequence of binary bits) from the codeword (e.g., the encoded original embedded data) received from storage at the memory device(s). LDPC decoding refers to a decoding method that utilizes an LDPC codeword (or codeword, more simply) to reconstruct the original embedded data. An ECC layer refers to a specific implementation level of error correction coding that includes additional parity bits that are calculated from the original data bits and stored alongside them. These parity bits are used by ECC algorithms (such as an LDPC algorithm) to check for inconsistencies in the data when the data is read back from the memory. If errors are detected, the ECC algorithm uses the information from these parity bits to attempt to locate and correct the errors. Each ECC layer enhances the ability of the system to correct more errors, providing a more robust defense against data corruption.

In the examples provided, the ECC layers refers to a level of complexity and protection in the ECC scheme, where adding more layers increases the number of parity bits and, consequently, the capability to correct more errors or larger errors. The implementation of ECC layers involves sophisticated coding such as LDPC codewords. For purposes of simplification of explanation, in the examples provided, unless otherwise noted, it is presumed that the codewords stored in the memory device 130 and the memory device 140 are LDPC codewords.

Figure 1B:
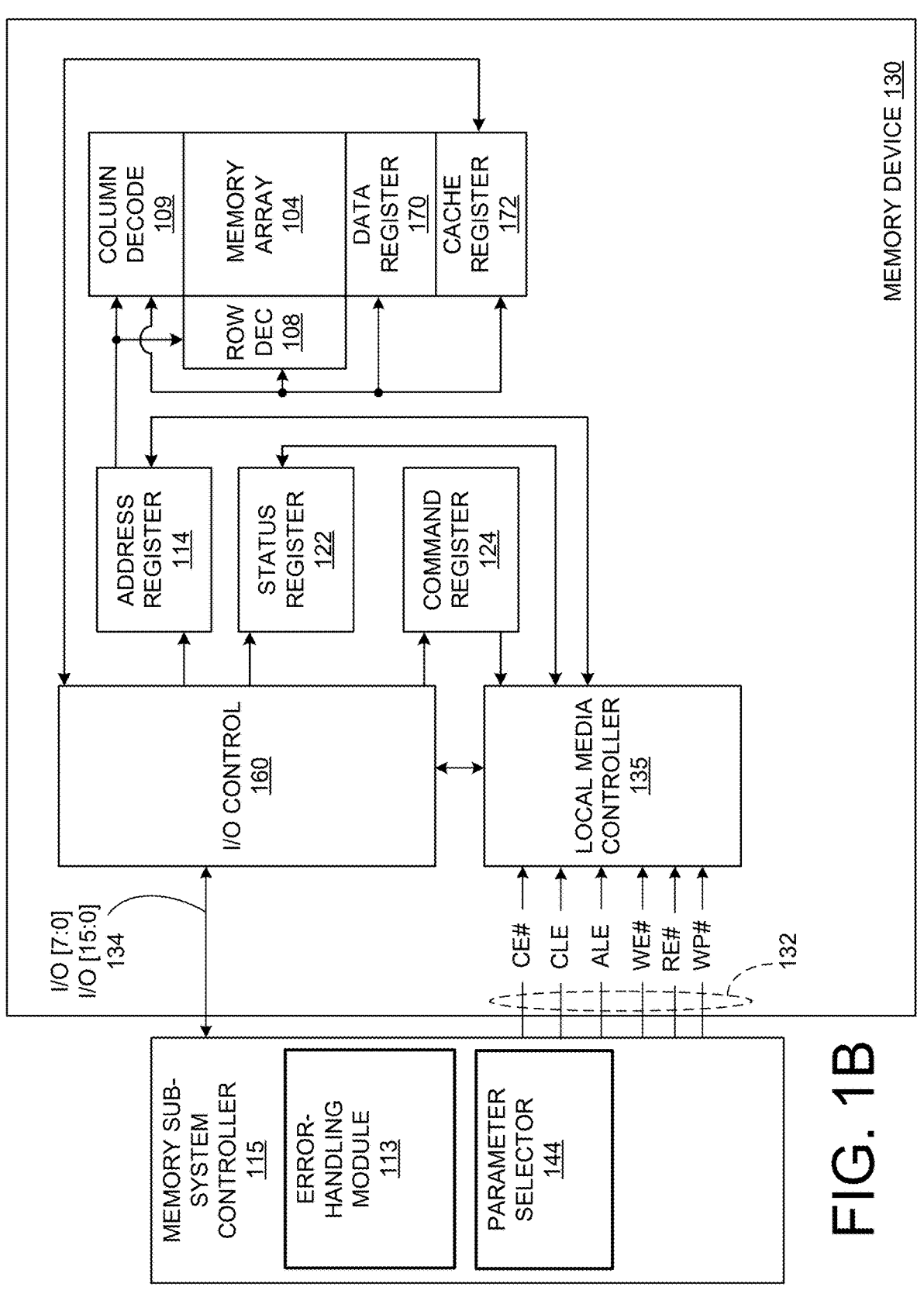
FIG. 1B illustrates a simplified block diagram of an example memory device in communication with a memory sub-system controller.

FIG. 1B illustrates a simplified block diagram of an example of a first apparatus, in the form of a memory device 130, in communication with an example of a second apparatus, in the form of a memory sub-system controller 115 of a memory sub-system (e.g., the memory sub-system 110 of FIG. 1A). Some examples of electronic systems include personal computers, personal digital assistants (PDAs), digital cameras, digital media players, digital recorders, games, appliances, vehicles, wireless devices, mobile telephones, etc. The memory sub-system controller 115 (e.g., a controller external to the memory device 130), can be a memory controller or other external host device.

The memory device 130 includes the memory array 104 formed of an array of memory cells logically arranged in rows and columns. The memory cells of the memory array 104 form a non-transitory computer-readable medium. Memory cells of a logical row are connected to the same access line (e.g., a wordline) while memory cells of a logical column are selectively connected to the same data line (e.g., a bit line) in some examples. In some examples, a single access line is associated with more than one logical row of memory cells and a single data line may be associated with more than one logical column. Memory cells (not shown in FIG. 1B) of at least a portion of the memory cells in the memory array 104 are capable of being programmed to one of at least two target data states.

The memory device 130 includes row decode circuitry 108 and column decode circuitry 109 for decoding address signals. Address signals are received and decoded to access the memory cells of the memory array 104 of the memory device 130. The memory device 130 also includes input/output (I/O) control circuitry 160 to manage input of commands, addresses and data to the memory device 130 as well as output of data and status information from the memory device 130. The memory device 130 has an address register 114 and is in communication with the I/O control circuitry 160, the row decode circuitry 108 and the column decode circuitry 109 to latch the address signals prior to decoding. The memory device 130 also includes a command register 124 in communication with the I/O control circuitry 160 and a local media controller 135 (e.g., the local media controller 135 of FIG. 1A) to latch incoming commands.

A controller (e.g., the local media controller 135 internal to the memory device 130) controls access to memory cells of the memory array 104 in response to the commands and generates status information for the external memory sub-system controller 115. For example, the local media controller 135 is configured to perform access operations (e.g., read operations, programming operations and/or erase operations) on the memory cells of the memory array 104. The local media controller 135 is in communication with the row decode circuitry 108 and the column decode circuitry 109 to control the row decode circuitry 108 and the column decode circuitry 109 in response to the addresses.

The local media controller 135 is also in communication with a cache register 172. The cache register 172 latches data, either incoming or outgoing, as directed by the local media controller 135 to temporarily store data while the memory cells of the memory array 104 are busy writing or reading, respectively, other data. During a program operation (e.g., write operation), data is passable from the cache register 172 to the data register 170 for transfer to the memory cells of the memory array 104, and new data can be latched in the cache register 172 from the I/O control circuitry 160. During a read operation, data is passable from the cache register 172 to the I/O control circuitry 160 for output to the memory sub-system controller 115. New data is passable from the data register 170 to the cache register 172. The cache register 172 and/or the data register 170 form (e.g., or form a portion of) a page buffer of the memory device 130. The page buffer includes sensing devices (not shown in FIG. 1B) to sense a data state of a memory cell of the memory array 104. For example, the sensing devices sense a state of a data line connected to that memory cell. The memory device 130 also includes a status register 122 in communication with the I/O control circuitry 160 and the local media controller 135 to latch the status information for output to the memory sub-system controller 115. The memory sub-system controller 115 includes the error-handling module 113 and the parameter selector 144.

The memory device 130 receives control signals at the memory sub-system controller 115 from the local media controller 135 over a control link 132. For example, the control signals can include a chip enable signal CE #, a command latch enable signal CLE, an address latch enable signal ALE, a write enable signal WE #, a read enable signal RE # and/or a write protect signal WP #. Additional or alternative control signals (not shown) can be further received over a control link 132 depending upon the nature of the memory device 130. In some examples, the memory device 130 receives command signals (which represent commands), address signals (which represent addresses) and data signals (which represent data) from the memory sub-system controller 115 over a multiplexed input/output (I/O) bus 134 and outputs data to the memory sub-system controller 115 over the I/O bus 134.

In some examples, the commands are received over input/output (I/O) pins [7:0] of the I/O bus 134 at I/O control circuitry 160 and may then be written into the command register 124. The addresses are received over input/output (I/O) pins [7:0] of the I/O bus 134 at I/O control circuitry 160 and written into the address register 114.

The data is receivable over input/output (I/O) pins [7:0] for an 8-bit device or input/output (I/O) pins [15:0] for a 16-bit device at I/O control circuitry 160 and is writable into the cache register 172. The data is subsequently written into the data register 170 for programming the memory cells of the memory array 104 in some examples.

In some examples, the cache register 172 is omitted, and in such examples, the data is written directly into the data register 170. Additionally or alternatively, data is output over input/output (I/O) pins [7:0] for an 8-bit device or input/output (I/O) pins [15:0] for a 16-bit device. Moreover, it is noted that although reference is made to I/O pins, in other examples, a different conductive node providing for electrical connection to the memory device 130 by an external device (e.g., the memory sub-system controller 115), such as conductive pads or conductive bumps could be used in addition to or as a replacement for the I/O pins.

The example memory device 130 of FIG. 1B has been simplified. Moreover, in other examples, the functionality of the various block components described with reference to FIG. 1B are not segregated to distinct components or component portions of an integrated circuit device. For example, a single component or component portion of an integrated circuit device could be adapted to perform the functionality of more than one block component of FIG. 1B. Alternatively, components or component portions of an integrated circuit device could be combined to perform the functionality of a single block component of FIG. 1B. Additionally, while specific I/O pins are described in accordance with popular conventions for receipt and output of the various signals, it is noted that other combinations or numbers of I/O pins (or other I/O node structures) are useable in various examples.

Referring back to FIG. 1A, Read Window Budget (RWB) is a parameter of the memory device 130 and the memory device 140 that measures a voltage threshold margin available for correctly reading data from memory cells. RWB is measured to ensure reliable data retrieval, even as memory cells degrade or under various operational stresses. RWB gain indicates an improvement to the RWB of the memory device 130 and/or the memory device 140. The RWB itself measures the voltage margin available to accurately read data from memory cells without errors. RWB gain, therefore, represents an increase in this RWB margin, which enhances the reliability and stability of read operations. An RWB gain implies that the memory system can tolerate greater variations in cell voltage levels during the reading process before errors occur.

ECC levels are related to RWB. In particular, higher ECC levels increase the capability to correct more errors within a codeword, compensating for a reduced RWB. In scenarios where the RWB of the memory device 130 or the memory device 140 is narrow, indicating tight voltage threshold margins, higher ECC levels are employed to maintain data integrity by correcting more errors during read operations. Conversely, a wider RWB allows for lower ECC levels, as the probability of encountering errors that need correction is reduced. Thus, the ECC selector 144 is programmed to achieve a balance between RWB and ECC levels to balance performance and reliability for the memory sub-system 110.

Raw Bit Error Rate (RBER), is often expressed as a ratio or a percentage. RBER quantifies a number of erroneous bits over a given number of total bits read from the memory array 104 under normal conditions, without any error correction applied.

RBER is often presented in units such as errors per bit read or as a probability, such as 1.00E-06 errors per bit, indicating the likelihood of an error in any given bit. ECC capability is often quantified by the number of errors that can be corrected within a given codeword. For instance, the ECC capability is often expressed as a simple count of bits or errors that can be corrected, such as "can correct up to 15 errors per 4 kilobyte (KB) codeword." ECC capability can also be described in terms of the strength or complexity of the ECC algorithm, such as the number of parity bits used or the type of ECC algorithm implemented (e.g., LDPC). RBER can be impacted, for example, by the presence of bad columns of the memory array 104, which leads to codewords with bits that have a low reliability.

Figure 2:
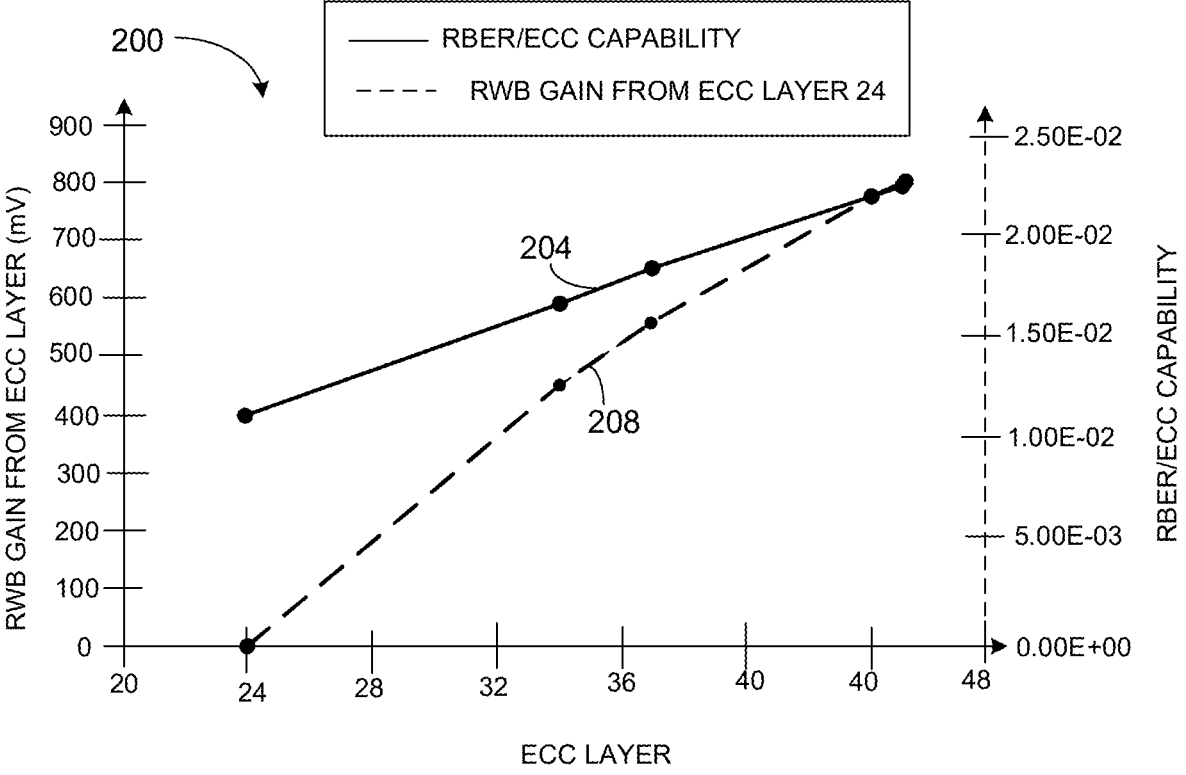
FIG. 2 illustrates a graph that plots read window budget (RWB) gain in and a ratio of the raw bit error rate (RBER) and ECC capability as a function of ECC layers.

FIG. 2 illustrates a graph 200 that plots RWB gain in millivolts (mV) and a ratio of the RBER and ECC capability (RBER/ECC capability) as a function of an ECC layer. The graph 200 includes a first plot 204 that plots the RBER/ECC capability as a function of the ECC layer and a second plot 208 that plots the RWB gain from an ECC layer of 24. As is illustrated, both the RBER/ECC capability and the RWB gain increase as a function of the ECC layer.

Referring back to FIG. 1A, in operation, the presence of bad columns can significantly degrade data integrity and overall device performance. Previous approaches for implementing ECC do not account for the uneven distribution of defects across the memory array 104, leading to suboptimal use of ECC resources. Accordingly, the memory sub-system controller 115 is programed with redistribution of ECC capabilities, tailored to address the varying defect densities across different columns of the memory array 104. The memory sub-system controller 115 has embedded algorithms that assess the defectiveness of columns the memory array 104 by analyzing error occurrences during regular memory operations. As an example, the error-handling module 113 can decode codewords extracted from pages of the memory array 104. The error-handling module 113 can be configured to identify codewords that have an error rate that exceed an RBER/ECC capability of a base number of ECC layers (e.g., 30 layers). For example, as indicated by the graph 200 if a first codeword read from a particular memory page and a particular plane of the memory device 130 has an RBER of 1.4E-02 and the based ECC level of 30, the first codeword may lose data integrity. Accordingly, the first codeword for the particular memory page at the particular memory plane can be flagged by the error-handling module 113 as having a bad column (or multiple bad columns) by the error-handling module 113. In other examples, the memory sub-system controller 115 can execute a test and monitor test results to identify sectors of the memory array 104 that have bad columns, and map the identified sectors to particular codewords (e.g., the first codeword explained in the present example) that employ the identified bad columns. In still other examples, other testing (e.g., probe testing) can be executed on the memory device 130 and the memory device 140, and in these situations, the memory sub-system controller 115 can be preprogrammed with a physical address of bad columns. The memory sub-system controller 115 can map these bad columns to logical addresses (e.g., pages) and codewords that employs the bad columns to identify the codewords with bad columns. In any such situation, redistribution of ECC layers can compensate for the codewords with bad columns. FIG. 3 illustrates the concept of redistribution of ECC layers in a memory page range, where each memory page in the memory page range shares the same bad columns.

More particularly, FIG. 3 illustrates a first spreadsheet 300 that could represent, for example a portion of the memory array 104. Each cell of the first spreadsheet 300 includes data characterizing a size of codeword, namely 4 KB plus a certain number of ECC levels. Thus, the text "4 kB+30L" indicates a 4 KB codeword that includes 30 ECC layers. As illustrated, codeword 3 (of codewords 0-3) of memory page range 2, plane 2 has been flagged as having a bad column. For example, as indicated by the graph 200 if codeword 3 were read from memory page range 2, plane 2 of the memory device 130, and the codeword 3 has an RBER of 1.4E-02 and the based ECC level of 30, the codeword 3 may lose data integrity.

Referring back to FIG. 1A, in response to identifying the first codeword (that has bad columns), the ECC selector 144 determines a number of bits of the first codeword that are impacted by the bad columns, as these bits have a low reliability. The ECC selector 144 employs this information (the number of bits with a low reliability) for the first codeword to calculate an ECC level needed to correct the errors introduced by the bad columns.

The ECC level is calculated to ensure the error-handling module 113 can correct the increased number of errors per codeword. For example, if the original ECC level (e.g., level 30) could correct up to 30 errors but bad columns introduce 5 additional potential errors, the new ECC level must be capable of correcting at least 35 errors per codeword.

Additionally, the error-handling module 113 can be configured to identify codewords from the same memory page as the first codeword that have extra ECC layers. More specifically, the error-handling module 113 can be configured to flag codewords with an error rate that is less than the RBER/ECC capability of the base number of ECC layers (e.g., 30 layers). For example, as indicated by the graph 200 if a second codeword read from the (same as the first codeword) particular memory page range and the (same as the first codeword) particular plane of the memory device 130 has an RBER of 5.00E-03 and the based ECC level of 30, the second codeword can be flagged to have extra ECC layers. FIG. 3 illustrates this concept as well. In particular, in FIG. 3, as indicated by the first spreadsheet 300, codeword 2 of memory page range 2, plane 2 has been flagged as having an extra ECC layer.

Referring back to FIG. 1A, responsive to identifying the codeword with bad columns, and the codeword(s) in the same memory page (and same plane) that have an extra ECC parity layer (or multiple extra parity layers), the ECC selector 144 is configured to redistribute the ECC layers. In particular, continuing with the above example, this redistribution "borrows" the extra ECC layer from the second codeword of the particular memory page and adds the ECC capacity to the first codeword that has been flagged as having a bad column. FIG. 3 illustrates a second spreadsheet 320 that represents a modified version of the first spreadsheet 300. In the second spreadsheet 320, the codeword 3 of memory page range 2 of plane 2 has 31 ECC layers, as indicated by the text "4 kB+31L". The extra ECC layer has been borrowed from codeword 2 of memory page range 2 of plane 2 that (now) has 29 levels, as indicated by the text "4 kB+29L". Thus, although the amount of data stored in the memory page range 2, plane 2 has remained constant, the ECC capability has been distributed to compensate for the bad column(s) present in the portion of the memory device corresponding to this memory page. Referring back to FIG. 1A, the redistribution of the ECC layers can be managed logically by the ECC selector 144, such that the redistribution does not require physical relocation of ECC data. Instead, the ECC selector 144 tunes the allocation (e.g., through the redistribution) of the ECC layers to improve error correction efficiency where this error correction is needed the most.

The ECC selector 144 improves the efficiency and effectiveness of the error correction of the memory device 130 and the memory device 140 by redistributing ECC layers according to the needs of specific columns based on the defectiveness of columns in the memory array 104. The redistribution of the ECC layers not only enhances data integrity and increases manufacturing yield but also improves the RWB of the memory device 130 and the memory device 140.

Figure 4:
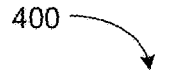
FIG. 4 illustrates an example of a table that provides an example of two different deployable ECC.

FIG. 4 illustrates an example of a table 400 that provides two different ECC distributions that could be deployed by the ECC selector 144. The table illustrates the improvement in RWB loss. As illustrated in the table 400, in a first original case ("1-Original"), there are four codewords (codewords 0-3) in a given memory page on a give plane. In the first original case, codewords 0-2 have not been flagged as having bad columns that cause bad bits. However, for codeword 3, 32 columns have been flagged as bad, indicating that codeword 3 has 32 bits with a low reliability. As indicated for the first original case, codewords 0-3 each have a 30 ECC layers ("30L"). Moreover, for the first original case, there is an equivalent RWB loss of 100 mV that is limited by codeword 3 having 32 bits with a low reliability.

Conversely, in a first modified case ("1-Modified") there are still 32 bits that have a low reliability (e.g., due to bad columns) in codeword 3, and codewords 0-2 have no bad columns, indicating a high reliability, and extra parity levels available. Thus, as indicated, in the first modified case, one parity level is borrowed from codewords 0-2, such that codewords 0-2 have parity levels of 29 ("29L"). Moreover, codeword 3 has these 3 borrowed parity levels added, such that codeword 3 in the first modified case has 33 levels ("33L"). Consequently, for the first modified case, there is an equivalent RWB loss of 30 mV that is limited by codewords 0-2. More specifically, there is an equivalent RWB loss of 100 mV caused by the 32 bad columns (inducing the 32 bits with low reliability) for codeword 3 in the first modified case. Additionally, as indicated by the graph 200 of FIG. 2, adding 3 additional parity levels to codeword 3, such that codeword 3 has 33 parity levels, reduces the RWB loss to 10 mV, because each parity level added reduces the RWB loss by 30 mV. Further, reducing the parity level for codewords 0-2 by 1 parity level, such that codewords 0-2 have 29 parity levels, increases the equivalent RWB loss to 30 mV. Because the equivalent RWB loss for codewords 0-2 with 29 parity levels (30 mV) is greater than the equivalent RWB loss for codeword 3 with 33 parity levels (10 mV), the equivalent RWB loss is determined by (e.g., limited by) the equivalent RWB loss of codewords 0-2.

Further, in table 400, for a second original case ("2-Original"), codewords 0-2 have not been flagged as having bad columns that cause bad bits. However, for codeword 3, 100 columns have been flagged as bad, indicating that codeword 3 has 100 bits with a low reliability. As indicated for the second original case, codewords 0-3 each have 30 ECC layers ("30L"). Moreover, for the second original case, there is an equivalent RWB loss of 300 mV that is limited by codeword 3 having 100 bits with a low reliability.

Conversely, in a second modified case ("2-Modified") there are still 100 bits that have a low reliability (e.g., due to bad columns) in codeword 3, and codewords 0-2 have no bad columns, indicating a high reliability, and extra parity levels available. Thus, as indicated, in the second modified case, 3 parity level are borrowed from codewords 0-2, such that codewords 0-2 have parity levels of 27 ("27L"). Moreover, codeword 3 has these 3 borrowed parity levels added, such that codeword 3 in the second modified case has 39 levels ("39L"). Moreover, for the first modified case, there is an equivalent RWB loss of 90 mV that is limited by codewords 0-2. More specifically, there is an equivalent RWB loss of 300 mV caused by the 100 bad columns (inducing the 32 bits with low reliability) for codeword 3 in the second modified case. Additionally, adding 9 additional parity levels to codeword 3, such that codeword 3 has 39 parity levels, reduces the RWB loss to nearly 0 mV, because each parity level added reduces the RWB loss by 30 mV. Further, reducing the parity level for codewords 0-2 by 3 parity levels, such that codewords 0-2 have 27 parity levels, increases the equivalent RWB loss to 90 mV (30 mV for each loss of a parity level). Because the equivalent RWB loss for codewords 0-2 with 27 parity levels (90 mV) is greater than the equivalent RWB loss for codeword 3 with 39 parity levels (about 0 mV), the equivalent RWB loss is determined by the equivalent RWB loss of codewords 0-2.

Referring back to FIG. 1A, the ECC selector 144 is configured to implement (e.g., deploy) the redistribution of the ECC levels in a manner similar to the operations described with respect to FIGS. 3-4. Through deployment of the redistribution of ECC levels, the overall use of memory resources is improved, leading to more reliable and efficient memory solutions. Thus, redistributing the ECC levels improves error correction capability for codewords that need extra ECC levels. Additionally, this redistributing of the ECC levels improves yield of memory dies singulated from a wafer. In particular, redistribution of the ECC layers enables recovery of memory dies by increasing the ECC layers for certain codewords to compensate for bad columns, while decreasing the ECC layers of codewords that are not experiencing bad columns.

Figure 5:
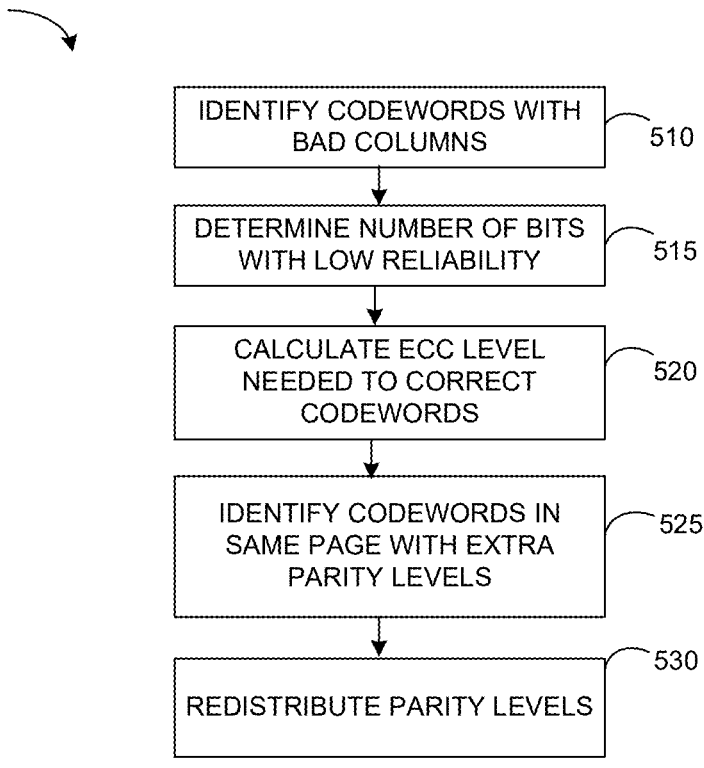
FIG. 5 illustrates a flowchart of an example method redistributing ECC levels to compensate for bad columns of a memory device.

FIG. 5 illustrates a flowchart of an example method 500 for redistributing ECC levels to compensate for bad columns of a memory device (e.g., the memory device 130). The method 500 could be executed, for example, by a memory controller, such as the memory sub-system controller 115.

At block 510, the memory controller identifies codewords that have bad columns. These codewords are identified by executing testing and monitoring, and pinpointing the codewords that consistently exhibit errors due to bad columns in a memory array (e.g., the memory array 104). At block 515, the memory controller determines a number of bits for each codeword with bad columns that have a low reliability (e.g., the number of bits impacted by the bad columns). At block 520, the memory controller calculates an ECC level needed to correct errors present in each such codeword with bad columns. Stated differently, the memory controller determines the number of additional ECC levels needed to correct the errors introduced by these bad columns, and these additional ECC levels correspond to an increased number of parity bits.

At block 525, the memory controller identifies codewords that are in the same page (and same plane) as the codewords with bad columns that have extra parity levels. The codewords that have extra parity levels are codewords with no bad columns, such that one or more ECC levels can be borrowed and redistributed to the codeword in the same page with bad columns. At block 530, the memory controller redistributes the ECC levels by increasing the ECC levels of the codewords with bad columns to the ECC level needed to correct the errors caused by the bad columns, and decreasing the ECC levels of the codewords in the same page(s) that have the extra parity levels. Further, the redistribution ensures that the RWB does not drop below an acceptable performance level (e.g., a performance threshold). Stated differently, responsive to the redistribution, the RWB meets the performance threshold.

Figure 6:
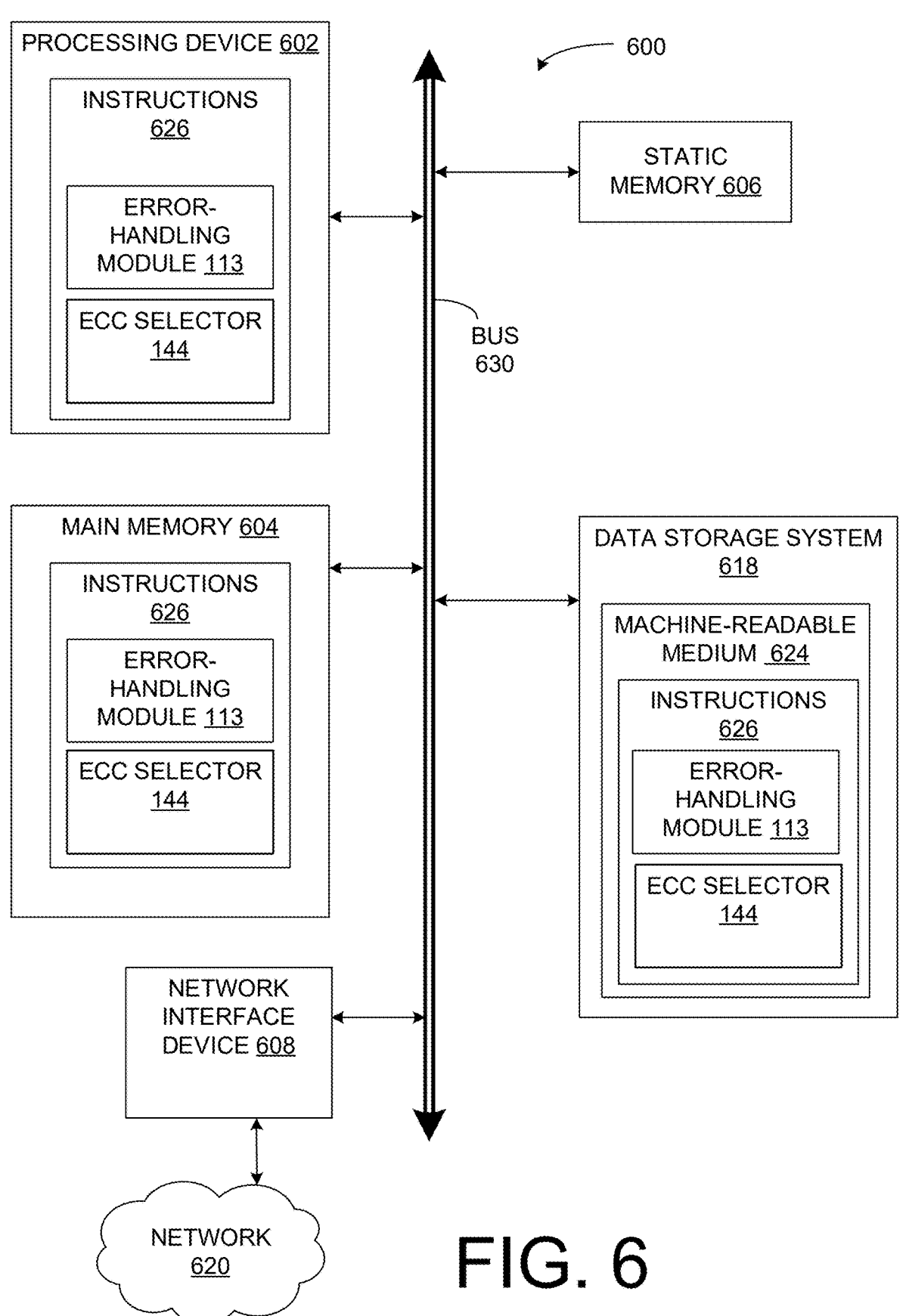
FIG. 6 illustrates an example of a computer system (a machine) in which examples of the present description may operate.

FIG. 6 illustrates an example machine of a computer system 600 (a machine) within which a set of instructions, for causing the machine to perform any one or more of the methodologies discussed herein, can be executed. In some examples, the computer system 600 corresponds to a host system (e.g., the host system 120 of FIG. 1A) that includes, is coupled to, or utilizes a memory sub-system (e.g., the memory sub-system 110 of FIG. 1A) or is used to perform the operations of a controller (e.g., to execute an operating system to perform operations corresponding to the ECC selector 144 and the error-handling module 113 of FIG. 1A). In other examples, the machine is connected (e.g., networked) to other machines in a LAN, an intranet, an extranet and/or the Internet. In various examples, the machine operates in the capacity of a server or a client machine in client-server network environment, as a peer machine in a peer-to-peer (or distributed) network environment or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge or any machine capable of executing a set of instructions (sequential or otherwise) that specify actions to be taken by that machine. In other examples, the machine may be a computer within an automotive, a data center, a smart factory or other industrial application. Further, while a single machine is illustrated, the term "machine" shall also be taken to include any collection of machines that individually or jointly execute a set (or multiple sets) of instructions to perform the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM) or other non-transitory computer-readable media) and a data storage system 618, which communicate with each other via a bus 630.

The processing device 602 represents one or more general-purpose processing devices such as a microprocessor, a central processing unit, etc. More particularly, the processing device 602 can be a complex instruction set computing (CISC) microprocessor, reduced instruction set computing (RISC) microprocessor, very long instruction word (VLIW) microprocessor or a processor implementing other instruction sets or processors implementing a combination of instruction sets. In some examples, the processing device 602 is implemented with a special-purpose processing devices such as an application specific integrated circuit (ASIC), a field programmable gate array (FPGA), a digital signal processor (DSP), network processor, etc. The processing device 602 is configured to execute instructions 626 for performing the operations discussed herein. In some examples, the computer system 600 includes a network interface device 608 to communicate over the network 620.

The data storage system 618 includes a machine-readable storage medium 624 (also known as a computer-readable medium) that store sets of instructions 626 or software for executing the methodologies and/or functions described herein. In some examples, the machine-readable storage medium 624 includes instructions for implementing the error-handling module 113 and the ECC selector 144 of FIG. 1A, or some portion thereof. The machine-readable storage medium 624 is a non-transitory medium. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618 and/or main memory 604 can correspond to the memory sub-system 110 of FIG. 1A. Accordingly, the machine-readable storage medium 624, the data storage system 618 and/or the main memory 604 are examples of non-transitory computer-readable media.

In some examples, the instructions 626 include instructions to implement functionality corresponding to the error-handling module 113 and the ECC selector 144 of FIG. 1A. While the machine-readable storage medium 624 is shown in an example to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared and otherwise manipulated. It has proven convenient at times, principally for reasons of common usage, to refer to these signals as bits, values, elements, symbols, characters, terms, numbers, etc.

It is noted, however, that all of these and similar terms are to be associated with the appropriate physical quantities and are merely convenient labels applied to these quantities. This description can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

This description also relates to an apparatus for performing the operations herein. This apparatus can be specially constructed for the intended purposes or this apparatus can include a general purpose computer selectively activated or reconfigured by a computer program stored in the computer. Such a computer program can be stored in a computer readable storage medium, such as, but not limited to, any type of disk including floppy disks, optical disks, CD-ROMs, magnetic-optical disks, read-only memories (ROMs), random access memories (RAMs), EPROMs, EEPROMs, magnetic or optical cards or any type of media suitable for storing electronic instructions, each coupled to a computer system bus.

The algorithms and displays presented herein are not inherently related to any particular computer or other apparatus. Various general purpose systems can be used with programs in accordance with the descriptions herein, or it can prove convenient to construct a more specialized apparatus to perform the method. In addition, the present disclosure is not described with reference to any particular programming language. It will be appreciated that a variety of programming languages can be used to implement the teachings of the disclosure as described herein.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications and variations that fall within the scope of this application, including the appended claims. As used herein, the term "includes" means includes but not limited to, the term "including" means including but not limited to. The term "based on" means "based at least in part on". Additionally, where the disclosure or claims recite "a," "an," "a first" or "another" element, or the equivalent thereof, it should be interpreted to include one or more than one such element, neither requiring nor excluding two or more such elements.

What is claimed is:

1. A method for managing error correction in a memory device, the method comprising:

identifying, by a memory controller having an Error Correction Code (ECC) selector, codewords in a memory array of the memory device that are impacted by bad columns detected through testing or monitoring operations;

calculating, by the memory controller, a specific number of additional ECC layers for each identified codeword to correct errors introduced by the bad columns, wherein the specific number is determined by assessing an impact of the bad columns on bits of each identified codeword; and redistributing, by the memory controller, ECC layers from one or more other codewords within a same memory page and plane that have extra ECC layers to increase the ECC layers for the identified codewords with bad columns to enable implementation of the redistributed ECC layers on each codeword in the memory array, wherein the redistributing preserves physical locations of data within the memory array.

2. The method of claim 1, wherein identifying codewords impacted by bad columns further comprises:

executing testing and regular monitoring to detect columns that consistently exhibit errors; and assessing an impact of the bad columns on bits of each codeword to determine a number of bits in each identified codeword that have a low reliability.

3. The method of claim 2, wherein a given codeword of the identified codewords impacted by bad columns has at least 90 bits with a low reliability.

4. The method of claim 1, wherein calculating the specific number of additional ECC layers further comprises determining a number of additional ECC layers needed to correct the errors introduced by the bad columns.

5. The method of claim 1, wherein the redistributing ECC layers further comprises adjusting ECC levels across the memory array to allocate additional ECC resources to codewords impacted by bad columns and maintaining an ECC resource balance over the memory array.

6. The method of claim 1, wherein the memory device is a Not-AND (NAND) memory device.

7. The method of claim 1, wherein the ECC layers are redistributed such that a physical location of data within the memory array remains constant.

8. The method of claim 1, wherein each of the other codewords that have extra ECC layers are in a same memory page and plane as a corresponding one of the identified codewords impacted by bad columns.

9. The method of claim 1, wherein each codeword in the memory array is a low-density parity check (LDPC) codeword.

10. The method of claim 1, wherein a read window budget (RWB) for the memory array meets a threshold performance responsive to the redistributing.

11. A memory sub-system comprising:

a memory controller having an Error Correction Code (ECC) selector and storing data identifying codewords in a memory array of a memory device that are impacted by bad columns detected through testing or monitoring operations and storing data identifying a specific number additional ECC layers for each identified codeword based on errors introduced by the bad columns, wherein the specific number is determined by assessing an impact of the bad columns on bits of each identified codeword; and the ECC selector configured to redistribute ECC layers from one or more other codewords of the memory array within a same memory page and plane that have extra ECC layers to increase the number of ECC layers for the identified codewords impacted by bad columns, wherein the redistributing preserves physical locations of data within the memory array.

12. The memory sub-system of claim 11, wherein the memory controller is configured to perform testing and monitoring to detect columns that consistently exhibit errors and determines a number of bits with a low reliability for each identified codeword impacted by bad columns.

13. The memory sub-system of claim 11, wherein the memory controller determines a number of additional parity levels needed to correct the errors introduced by the bad columns for each identified codeword impacted by bad columns.

14. The memory sub-system of claim 11, wherein each of the other codewords that have extra ECC layers are in a same memory page and plane as a corresponding one of the identified codewords impacted by bad columns.

15. The memory sub-system of claim 11, wherein the memory controller further comprises an error-handling module configured to apply low density parity check (LDPC) decoding on codewords stored in the memory array based on the redistributed ECC layers.

16. The memory sub-system of claim 11, wherein the memory device is a Not-AND (NAND) memory device.

17. The memory sub-system of claim 11, wherein the ECC selector redistributes ECC layers such that a physical location of data within the memory array remains constant.

18. A non-transitory computer-readable medium storing instructions that, when executed by a processor of a memory sub-system, cause the memory sub-system to perform operations comprising:

identifying codewords in a memory array of a memory device that are impacted by bad columns detected through testing or monitoring operations;

calculating a specific number of additional Error Correction Code (ECC) layers for each identified codeword based on of errors introduced by the bad columns, wherein the specific number is determined by assessing an impact of the bad columns on bits of each identified codeword; and redistributing ECC layers of the memory device from one or more other codewords within a same memory page and plane that have extra ECC layers to increase the number of ECC layers for the identified codewords impacted by bad columns to enable implementation of the redistributed ECC layers on each codeword in the memory array, wherein the redistributing preserves physical locations of data within the memory array.

19. The non-transitory computer-readable medium of claim 18, wherein the operations further comprise performing testing and monitoring the memory array of the memory device to detect columns that consistently exhibit errors and determining a number of bits with low reliability for each identified codeword impacted by bad columns.

20. The non-transitory computer-readable medium of claim 18, wherein the operations further comprise determining the number of ECC layers needed to correct the errors introduced by the bad columns for each identified codeword that is impacted by bad columns.

* * * * *